United States Patent [19]

Badham

[11] Patent Number: 4,790,388

[45] Date of Patent: Dec. 13, 1988

[54] CULTIVATION TOOL REAR EDGES

[76] Inventor: Keith C. Badham, 1157 San Diego Dr., Salinas, Calif. 93901

[21] Appl. No.: 69,927

[22] Filed: Jul. 6, 1987

[51] Int. Cl.[4] ............................................. A01B 1/20
[52] U.S. Cl. .................................... 172/375; 172/380
[58] Field of Search ................ 172/371, 375, 378, 380

[56] References Cited

U.S. PATENT DOCUMENTS

| | | | |
|---|---|---|---|
| 97,863 | 12/1869 | Billings | 172/375 |
| 197,956 | 12/1877 | Walker | 172/375 |
| D. 253,807 | 1/1980 | Baylis | D8/11 |
| 1,000,473 | 8/1911 | Wilson | 172/371 |
| 1,954,250 | 4/1934 | Lee | 172/375 |
| 2,251,048 | 7/1941 | Garland | 172/375 X |
| 2,343,616 | 3/1944 | Kay | 172/375 |
| 3,592,272 | 7/1971 | Perez | 172/375 |
| 3,942,591 | 3/1976 | Brannin | 172/371 |

FOREIGN PATENT DOCUMENTS 80353 6/1952 Norway ............................ 172/375

*Primary Examiner*—Richard T. Stouffer
*Attorney, Agent, or Firm*—Townsend and Townsend

[57] ABSTRACT

A cultivation tool includes a flat plate having outer peripheral sharpened edges with one or more notches on the rear edges to permit cutting of weeds. A handle is coupled to the rear of the plate for pulling the plate rearwardly when a weed of weeds are in the notches.

6 Claims, 2 Drawing Sheets

CULTIVATION TOOL REAR EDGES

This invention relates to improvements in hand tools of the type used in gardens and, more particularly, to an improved cultivation tool which can be used in a manner similar to a hoe.

BACKGROUND OF THE INVENTION

Hoes are well known for use in working the soil and for recovering weeds and other unwanted growth from the ground. However, it is sometimes desirable not to disturb the soil when digging up weeds with a hoe. Thus, a conventional hoe has limitations which prevents it from being used to perform a number of different cultivating steps. Because of this drawback of conventional hoes, a need exists for an improved cultivation tool which can work the soil, if necessary, and to be used to cut weeds and other undesirable growth from the soil without disturbing the soil itself. The present invention satisfies this need.

Disclosures relating to this general subject area are the following U.S. Pat. Nos.:
97,863
D. 253,807
3,942,591
197,956
3,592,272

SUMMARY OF THE INVENTION

The present invention is directed to a cultivation tool which is formed from a flat plate to which a handle is secured. The plate has a sharpened or beveled edge around its entire periphery to present cutting edges therefor. Moreover, the rear edges of the plate can be provided with one or more notches therein with each notch having a sharpened edge so that the tool can be used to trap and then cut weeds by a pulling action, all of which can be accomplished without disturbing the soil or having to work the soil as required by a conventional hoe.

The cultivation tool of the present invention can be used with a long handle or a short handle. The tool is simple and rugged in construction, has no moving parts, and can be made inexpensively.

The primary object of the present invention is to provide an improved cultivation tool which includes a flat plate having an outer peripheral sharpened edge and one or more notches on the rear edges thereof to permit cutting of weeds and other undesirable growth without having to work the soil, yet the tool can be used for working the soil, if necessary, to thereby provide a tool which is simple and rugged in construction and is inexpensive to produce and maintain.

Other objects of this invention will become apparent as the following specification progresses, reference being had to the accompanying drawings for an illustration of the invention.

In the Drawings

Figure 2:
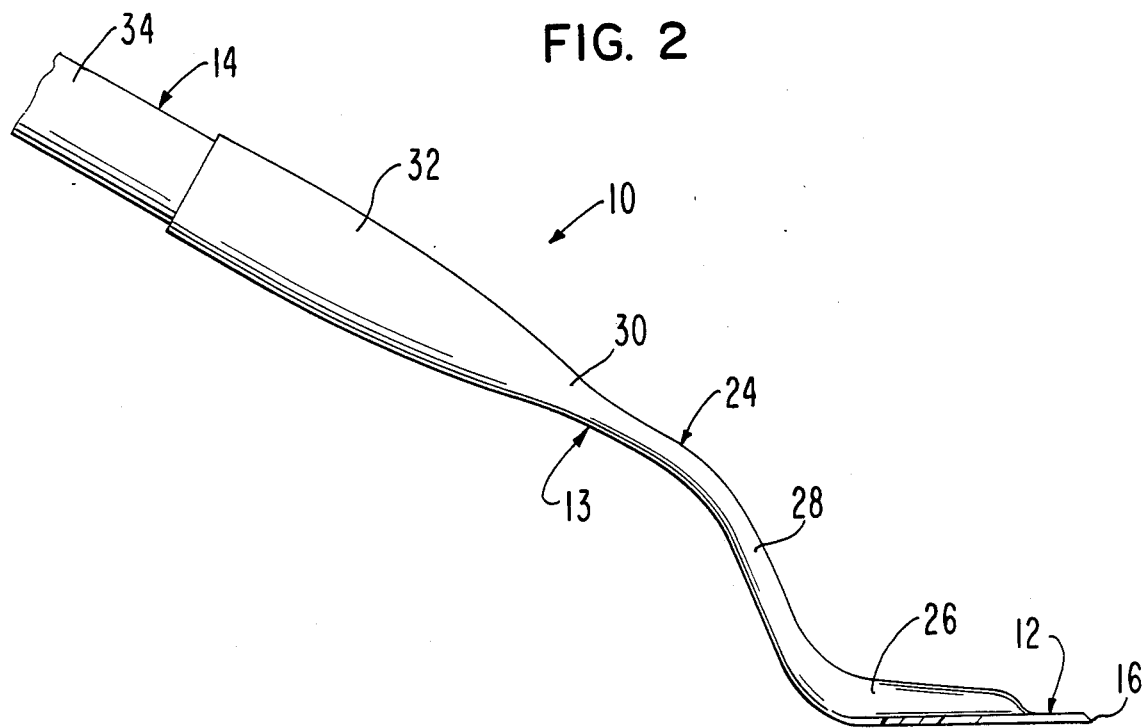
FIG. 2 is a side elevational view of the tool of FIG. 1.
Figure 2A:
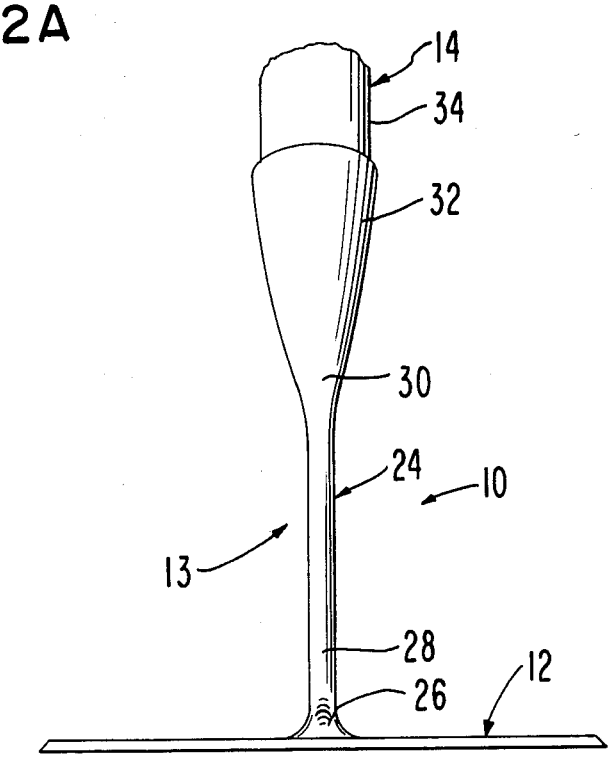
FIG. 2a is a front elevational view of the tool of FIGS. 1 and 2.
Figure 3:
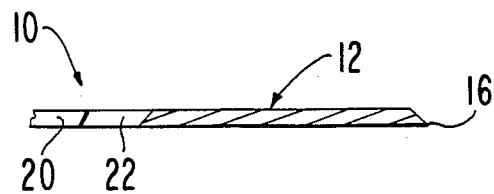
FIG. 3 is a cross-sectional view taken along line 3—3 of FIG. 1.

The cultivation tool of the present invention is broadly denoted by the numeral 10 and includes a plate 12 secured in any suitable manner by coupling means 13 to a handle 14. The tool is in the nature of a hoe but is more versatile than a hoe. The plate 12 is typically of steel or other suitable metal and includes a generally straight front edge 16, a pair of generally parallel side edges 18, and pair of rear edges 20 which extend rearwardly and inwardly from side edges 18 to the lower front part of means 13. All of the edges 16, 18 and 20 are sharpened to present knife edges, such edges being beveled as shown in FIGS. 2, 2A and 3.

Each of rear edges 20 has a pair of spaced notches 22 therein which are V-shaped in configuration and are also sharpened to present knife edges. These notches are adapted to receive plants and other growth which are to be cut by the knife edges of the notches by a pulling action on the plate 12 by handle 14.

Plate 12 is relatively thin, such as of the order of 1/16 inch. The plate is flat and the bottom surface of the plate is parallel with the top surface thereof.

Coupling means 13 has a goose neck part 24 defined by a front, lower segment 26, a first, inclined segment 28 integral with segment 26, and a second inclined segment 30 which merges into a tubular shank 32 for receiving a wooden, metallic or plastic handle member 34 which may be of 3 to 5 feet in length. In the alternative, upper segment 30 could be coupled directly to a short handle. Thus, the handle 14 can be either long or short depending upon the use to which the tool is to be put. A long handle is provided when the user is in a standing position while using the tool 10. The short handle is used when the user is in a squatting position or on hands and knees for close-up work.

Figure 1:
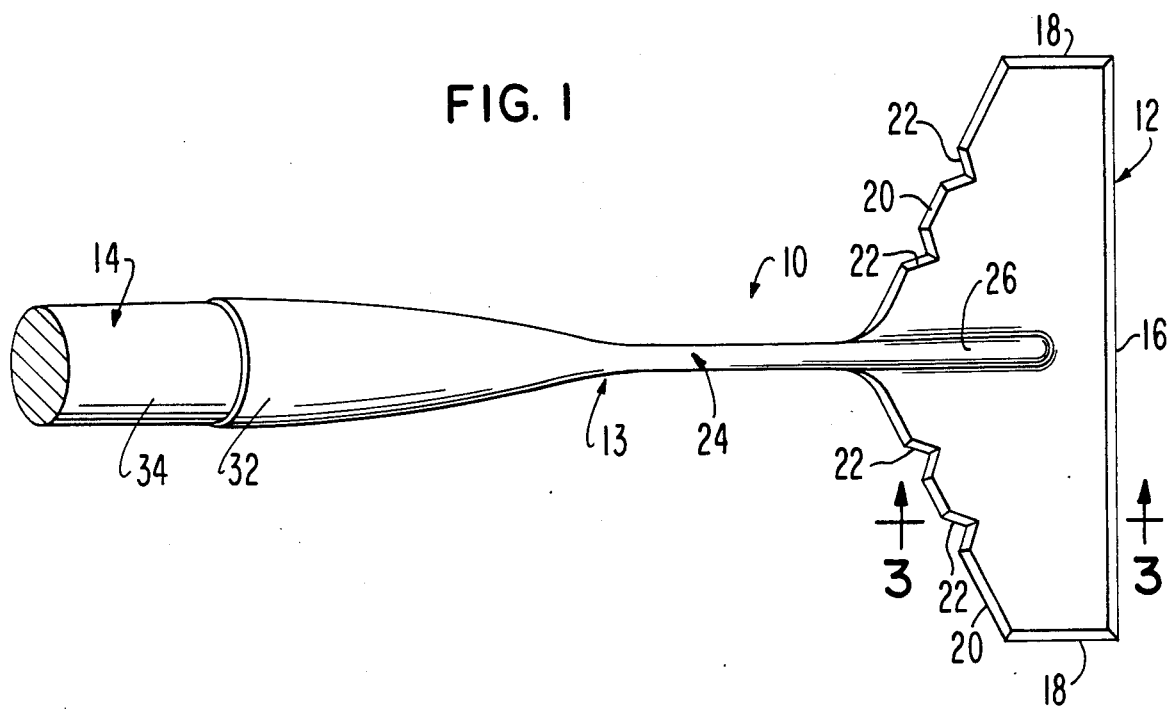
FIG. 1 is a top plan view of the cultivation tool of the present invention, the handle of the tool being broken away to illustrate details of construction.

Segment 26 is secured in any suitable manner, such as by welding, to the upper surface of the plate, midway between and parallel with side edges 18 as shown in FIG. 1. Segment 28 is relatively straight and connects segment 30 with segment 26. Thus, segments 26, 28 and 30 are all integral with each other and the segments 28 and 30 are inclined when the plate 12 is generally horizontal as shown in FIG. 2.

In use, tool 10 is manipulated by the hand or hands such that the knife edges on the outer periphery of plate 12 can be used for cutting weeds from the ground or for loosening the soil by a pushing or pulling motion. By making plate 12 relatively thin, it is possible to sever weeds and the like close to the roots thereof yet the notches 22 at the rear edges 20 of the plate 12 can trap and cut certain weeds and grasses which are to be eliminated. While pulling rearwardly on the plate when a weed or weeds are in notches 22, the weeds are properly and quickly cut by the knife edges of the notches.

I claim:
1. A cultivation tool comprising:
 a plate having a generally straight front edge, a pair of spaced, generally parallel side edges, and a pair of rear edges, said edges defining an outer periphery, said edges being sharpened along and about said outer periphery, said rear edges converging toward each other as the rear end of the plate is approached, said rear edges extending rearwardly and inwardly from said side edges;
 a handle; and means coupling the handle to the plate, said means including a first, elongated rigid segment secured along its length to the plate and being substantially parallel to the side edges, said first segment extending to the rear end of said plate, said rear edges extending to said first segment, and a second, elongated rigid segment extending rearwardly away from the first segment and from said plate and being inclined relative thereto, said handle being coupled to the second segment.

2. A cultivation tool as set forth in claim 1, wherein each of said rear edges has at least one notch therein, each said notch having a knife edge.

3. A cultivating tool as set forth in claim 2, wherein said side edges are spaced equidistant from said first segment.

4. A cultivation tool as set forth in claim 1, wherein said first segment is symmetrically located relative to and between the side edges of the plate.

5. A cultivation tool as set forth in claim 1, wherein said plate has a pair of opposed, substantially flat surfaces.

6. A cultivation tool as set forth in claim 1, wherein said first segment is rigidly secured to the upper surface of the plate.

* * * * *